US008721756B2

(12) United States Patent
Handley et al.

(10) Patent No.: US 8,721,756 B2
(45) Date of Patent: May 13, 2014

(54) FILTER CONSTRUCTION FOR USE WITH AIR IN-TAKE FOR GAS TURBINE AND METHODS

(75) Inventors: Michael W. Handley, Farmington, MN (US); Mark Brandenhoff, Lakeville, MN (US); Kirit Patel, Bridgewater, NJ (US); Timothy D. Sporre, Brooklyn Park, MN (US)

(73) Assignee: Donaldson Company, Inc., Bloomington, MN (US)

( * ) Notice: Subject to any disclaimer, the term of this patent is extended or adjusted under 35 U.S.C. 154(b) by 0 days.

(21) Appl. No.: 13/616,627

(22) Filed: Sep. 14, 2012

(65) Prior Publication Data

US 2013/0008313 A1 Jan. 10, 2013

Related U.S. Application Data

(63) Continuation of application No. 12/482,911, filed on Jun. 11, 2009.

(60) Provisional application No. 61/061,408, filed on Jun. 13, 2008.

(51) Int. Cl.
 B01D 46/00 (2006.01)
 B01D 46/52 (2006.01)
 B01D 71/02 (2006.01)

(52) U.S. Cl.
 USPC ............ 55/486; 55/385.1; 55/487; 55/498; 55/521; 55/524; 55/528; 96/4; 96/11; 96/12; 95/280; 95/285

(58) Field of Classification Search
 USPC ........ 55/302, 385.1, 486, 487, 498, 521, 524, 55/527, 528; 96/4, 11, 12; 95/45, 280, 95/285, 286, 287
 See application file for complete search history.

(56) References Cited

U.S. PATENT DOCUMENTS

| 3,870,495 A | 3/1975 | Dixson et al. |
| 3,950,157 A | 4/1976 | Matney |
| 3,953,566 A | 4/1976 | Gore |
| 3,972,694 A | 8/1976 | Head |
| 4,025,679 A | 5/1977 | Denny |
| 4,187,390 A | 2/1980 | Gore |
| 4,190,217 A | 2/1980 | O'Connor |

(Continued)

FOREIGN PATENT DOCUMENTS

| EP | 1 236 494 A1 | 9/2002 |
| EP | 1 260 261 A1 | 11/2002 |

(Continued)

OTHER PUBLICATIONS

"Donaldson Torit(R) Cartridge Filters", Donaldson Company, Inc., 2002, 10 pages.*

(Continued)

*Primary Examiner* — Jason M Greene
(74) *Attorney, Agent, or Firm* — Mueting, Raasch & Gebhardt, P.A.

(57) ABSTRACT

The filter of the invention is a cartridge filter comprising a structure that can maintain a filter medium in an air stream to filter particulates to protect a gas turbine power system. The filter combines a mechanically adequate filter structure and an effective filter medium for to obtain a useful system.

13 Claims, 7 Drawing Sheets

(56) References Cited

U.S. PATENT DOCUMENTS

| | | | |
|---|---|---|---|
| 4,365,049 A | 12/1982 | Tsunoda et al. | |
| 4,536,440 A | 8/1985 | Berg | |
| 4,604,205 A | 8/1986 | Ayers | |
| 4,668,258 A | 5/1987 | Steer | |
| 4,681,801 A | 7/1987 | Eian et al. | |
| 4,686,168 A | 8/1987 | Fujii et al. | |
| 4,728,349 A | 3/1988 | Oshitari | |
| 4,765,915 A | 8/1988 | Diehl | |
| 4,816,328 A | 3/1989 | Saville et al. | |
| 4,868,032 A | 9/1989 | Eian et al. | |
| 4,877,433 A | 10/1989 | Oshitari | |
| 4,878,930 A | 11/1989 | Manniso et al. | |
| 4,889,764 A | 12/1989 | Chenoweth et al. | |
| 4,911,789 A | 3/1990 | Rieunier et al. | |
| 4,945,125 A | 7/1990 | Dillon et al. | |
| 4,963,170 A | 10/1990 | Weber et al. | |
| 5,019,140 A | 5/1991 | Bowser et al. | |
| 5,057,217 A | 10/1991 | Lutz et al. | |
| 5,066,683 A | 11/1991 | Dillon et al. | |
| 5,096,473 A | 3/1992 | Sassa et al. | |
| 5,108,474 A | 4/1992 | Riedy et al. | |
| 5,114,447 A | 5/1992 | Davis | |
| 5,154,827 A | 10/1992 | Ashelin et al. | |
| 5,157,058 A | 10/1992 | Dillon et al. | |
| 5,158,586 A | 10/1992 | Layton | |
| 5,190,812 A | 3/1993 | Joseph et al. | |
| 5,207,812 A | 5/1993 | Tronto et al. | |
| 5,234,739 A | 8/1993 | Tanaru et al. | |
| 5,238,477 A | 8/1993 | Layton | |
| 5,240,479 A | 8/1993 | Bachinski | |
| 5,283,106 A | 2/1994 | Seiler et al. | |
| 5,354,603 A | 10/1994 | Errede et al. | |
| 5,362,553 A | 11/1994 | Dillon et al. | |
| 5,366,631 A | 11/1994 | Adiletta | |
| 5,401,448 A | 3/1995 | Ricciardi et al. | |
| 5,409,515 A | 4/1995 | Yamamoto et al. | |
| 5,462,586 A | 10/1995 | Sugiyama et al. | |
| 5,472,467 A | 12/1995 | Pfeffer | |
| 5,496,396 A | 3/1996 | Allan et al. | |
| 5,507,847 A | 4/1996 | George et al. | |
| 5,522,908 A | 6/1996 | Frey | |
| 5,554,414 A | 9/1996 | Moya et al. | |
| 5,560,974 A | 10/1996 | Langley | |
| 5,607,735 A | 3/1997 | Brown | |
| 5,614,250 A | 3/1997 | Diener et al. | |
| 5,616,408 A | 4/1997 | Oleszczuk et al. | |
| 5,620,785 A | 4/1997 | Watt et al. | |
| 5,643,653 A | 7/1997 | Griesbach et al. | |
| 5,645,057 A | 7/1997 | Watt et al. | |
| 5,662,728 A | 9/1997 | Groeger | |
| 5,665,235 A | 9/1997 | Gildersleeve et al. | |
| 5,672,399 A | 9/1997 | Kahlbaugh et al. | |
| 5,672,415 A | 9/1997 | Sawyer et al. | |
| 5,709,735 A | 1/1998 | Midkiff et al. | |
| 5,709,798 A | 1/1998 | Adiletta | |
| 5,728,187 A | 3/1998 | Kern et al. | |
| 5,766,288 A | 6/1998 | Thiele et al. | |
| 5,772,884 A | 6/1998 | Tanaka et al. | |
| 5,783,086 A | 7/1998 | Scanlon et al. | |
| 5,785,725 A | 7/1998 | Cusick et al. | |
| 5,804,286 A | 9/1998 | Quantrille et al. | |
| 5,814,405 A | 9/1998 | Branca et al. | |
| 5,843,390 A | 12/1998 | Plinke et al. | |
| 5,849,235 A | 12/1998 | Sassa et al. | |
| 5,855,783 A | 1/1999 | Shucosky et al. | |
| 5,885,738 A | 3/1999 | Hannon | |
| 5,891,402 A | 4/1999 | Sassa et al. | |
| 5,928,414 A | 7/1999 | Wnenchak et al. | |
| 5,952,252 A | 9/1999 | Shawver et al. | |
| 5,954,962 A | 9/1999 | Adiletta | |
| 5,965,468 A | 10/1999 | Marmon et al. | |
| 5,981,410 A | 11/1999 | Hansen et al. | |
| 6,010,785 A | 1/2000 | Kruszewski | |
| 6,024,782 A | 2/2000 | Freund et al. | |
| 6,027,553 A | 2/2000 | Hirano et al. | |
| 6,030,428 A | 2/2000 | Ishino et al. | |
| 6,030,484 A | 2/2000 | Maeoka et al. | |
| 6,110,243 A | 8/2000 | Wnenchak et al. | |
| 6,110,249 A | 8/2000 | Medcalf et al. | |
| 6,123,751 A | 9/2000 | Nelson et al. | |
| 6,136,058 A | 10/2000 | Miller | |
| 6,149,702 A | 11/2000 | Kawano et al. | |
| 6,151,763 A | 11/2000 | Kruszewski | |
| 6,165,572 A | 12/2000 | Kahlbaugh et al. | |
| 6,171,369 B1 | 1/2001 | Schultink et al. | |
| 6,171,684 B1 | 1/2001 | Kahlbaugh et al. | |
| 6,196,708 B1 | 3/2001 | Rogers | |
| 6,197,709 B1 | 3/2001 | Tsai et al. | |
| 6,200,669 B1 | 3/2001 | Marmon et al. | |
| 6,214,093 B1 | 4/2001 | Nabata et al. | |
| 6,228,477 B1 | 5/2001 | Klare et al. | |
| 6,261,979 B1 | 7/2001 | Tanaka et al. | |
| 6,264,044 B1 | 7/2001 | Meyering et al. | |
| 6,267,252 B1 | 7/2001 | Amsler | |
| 6,296,691 B1 | 10/2001 | Gidumal | |
| 6,302,934 B1 | 10/2001 | Nabata et al. | |
| 6,334,881 B1 | 1/2002 | Giannetta et al. | |
| 6,336,948 B1 | 1/2002 | Inoue et al. | |
| 6,365,532 B1 | 4/2002 | Kruszewski | |
| 6,372,004 B1 | 4/2002 | Schultink et al. | |
| 6,409,785 B1 | 6/2002 | Smithies et al. | |
| 6,409,787 B1 | 6/2002 | Smithies et al. | |
| 6,410,084 B1 | 6/2002 | Klare et al. | |
| 6,428,610 B1 | 8/2002 | Tsai et al. | |
| 6,468,930 B2 | 10/2002 | Kruszewski | |
| 6,514,325 B2 | 2/2003 | Cox et al. | |
| 6,517,612 B1 * | 2/2003 | Crouch et al. | 55/528 |
| 6,524,360 B2 | 2/2003 | Cox et al. | |
| 6,554,881 B1 | 4/2003 | Healey | |
| 6,555,489 B1 | 4/2003 | Pfeffer | |
| 6,559,080 B2 | 5/2003 | Kruszewski | |
| 6,576,034 B2 | 6/2003 | Berger | |
| 6,582,113 B2 | 6/2003 | Rogers | |
| 6,607,810 B1 | 8/2003 | Boich | |
| 6,613,704 B1 | 9/2003 | Arnold et al. | |
| 6,616,723 B2 | 9/2003 | Berger | |
| 6,669,761 B2 | 12/2003 | Schultheiss et al. | |
| 6,676,993 B2 | 1/2004 | Klare | |
| 6,682,576 B1 | 1/2004 | Kiyotani et al. | |
| 6,713,011 B2 | 3/2004 | Chu et al. | |
| 6,723,669 B1 | 4/2004 | Clark et al. | |
| 6,746,517 B2 | 6/2004 | Benson et al. | |
| 6,808,553 B2 | 10/2004 | Kawano et al. | |
| 6,821,321 B2 | 11/2004 | Chinn et al. | |
| 6,858,057 B2 | 2/2005 | Healey | |
| 6,872,233 B2 | 3/2005 | Smithies et al. | |
| 6,872,431 B2 | 3/2005 | Kahlbaugh et al. | |
| 6,926,961 B2 | 8/2005 | Roth | |
| 6,939,386 B2 | 9/2005 | Sato et al. | |
| 7,008,465 B2 | 3/2006 | Graham et al. | |
| 7,029,516 B2 | 4/2006 | Campbell et al. | |
| 7,049,254 B2 | 5/2006 | Bansal et al. | |
| 7,094,270 B2 | 8/2006 | Schultink et al. | |
| 7,115,151 B2 | 10/2006 | Smithies et al. | |
| 7,138,057 B2 | 11/2006 | Debes et al. | |
| 7,150,774 B2 | 12/2006 | Kubokawa et al. | |
| 7,156,898 B2 | 1/2007 | Jaisinghani | |
| 7,244,292 B2 | 7/2007 | Kirk et al. | |
| 7,247,374 B2 | 7/2007 | Haggquist | |
| 7,309,372 B2 | 12/2007 | Kahlbaugh et al. | |
| 7,314,497 B2 | 1/2008 | Kahlbaugh et al. | |
| 7,316,723 B2 | 1/2008 | Chung et al. | |
| 7,387,700 B2 | 6/2008 | Tanaka et al. | |
| 7,390,443 B1 | 6/2008 | Choi | |
| 7,398,887 B2 | 7/2008 | Choi | |
| 7,407,703 B2 | 8/2008 | DeYoung et al. | |
| 7,441,667 B2 | 10/2008 | Galvin et al. | |
| 7,501,003 B2 | 3/2009 | Muller et al. | |
| 7,517,454 B2 | 4/2009 | Hu et al. | |
| 7,534,471 B2 | 5/2009 | Klare et al. | |
| 7,572,321 B2 | 8/2009 | Yamakawa et al. | |
| 7,572,322 B2 | 8/2009 | Bohringer et al. | |
| 7,632,339 B2 | 12/2009 | Singh | |
| 7,837,756 B2 | 11/2010 | Choi | |

(56) References Cited

U.S. PATENT DOCUMENTS

| | | |
|---|---|---|
| 7,896,941 B2 | 3/2011 | Choi |
| 7,905,974 B2 | 3/2011 | Langlands et al. |
| 7,927,540 B2 | 4/2011 | Smithies et al. |
| 7,942,948 B2 | 5/2011 | Smithies et al. |
| 7,947,142 B2 | 5/2011 | Fox et al. |
| 7,959,705 B2 | 6/2011 | Choi |
| 7,993,523 B2 | 8/2011 | Chen et al. |
| 8,038,013 B2 | 10/2011 | Chen et al. |
| 8,042,694 B2 | 10/2011 | Driml et al. |
| 8,057,567 B2 | 11/2011 | Webb et al. |
| 8,073,338 B2 | 12/2011 | Buelow |
| 8,088,445 B2 | 1/2012 | Thottupurathu |
| 8,114,197 B2 | 2/2012 | Sealey et al. |
| 8,147,583 B2 | 4/2012 | Gebert et al. |
| 8,152,889 B2 | 4/2012 | Choi |
| 8,206,481 B2 | 6/2012 | Smithies et al. |
| 2001/0000375 A1 | 4/2001 | Kobayashi et al. |
| 2002/0013111 A1 | 1/2002 | Dugan et al. |
| 2002/0083690 A1 | 7/2002 | Emig et al. |
| 2002/0100725 A1 | 8/2002 | Lee et al. |
| 2002/0116910 A1 | 8/2002 | Berger |
| 2002/0121194 A1 | 9/2002 | Buchwald et al. |
| 2002/0127939 A1 | 9/2002 | Hwo et al. |
| 2002/0170434 A1 | 11/2002 | Kawano et al. |
| 2003/0010210 A1* | 1/2003 | Kawano et al. ................. 95/287 |
| 2003/0019193 A1 | 1/2003 | Chinn et al. |
| 2003/0022575 A1 | 1/2003 | Yoneda et al. |
| 2003/0033935 A1 | 2/2003 | Hu et al. |
| 2003/0084788 A1 | 5/2003 | Fraser, Jr. |
| 2003/0089092 A1 | 5/2003 | Bause et al. |
| 2003/0094102 A1 | 5/2003 | Maeoka et al. |
| 2003/0100944 A1 | 5/2003 | Laksin et al. |
| 2003/0109190 A1 | 6/2003 | Geel |
| 2003/0139110 A1 | 7/2003 | Nagaoka et al. |
| 2003/0145566 A1 | 8/2003 | Parks et al. |
| 2003/0145569 A1 | 8/2003 | Sato et al. |
| 2003/0148691 A1 | 8/2003 | Pelham et al. |
| 2004/0074387 A1 | 4/2004 | Jaisinghani |
| 2004/0134355 A1 | 7/2004 | Kasmark, Jr. |
| 2004/0192141 A1 | 9/2004 | Yang et al. |
| 2004/0255783 A1 | 12/2004 | Graham et al. |
| 2005/0079379 A1 | 4/2005 | Wadsworth et al. |
| 2005/0148261 A1 | 7/2005 | Close et al. |
| 2005/0160711 A1 | 7/2005 | Yang |
| 2005/0210844 A1 | 9/2005 | Kahlbaugh et al. |
| 2005/0214188 A1 | 9/2005 | Rohrbach et al. |
| 2005/0233665 A1 | 10/2005 | Groten et al. |
| 2005/0235619 A1 | 10/2005 | Heinz et al. |
| 2006/0009106 A1 | 1/2006 | Nishimura et al. |
| 2006/0096263 A1* | 5/2006 | Kahlbaugh et al. ............. 55/527 |
| 2006/0096932 A1 | 5/2006 | Dema et al. |
| 2006/0101796 A1 | 5/2006 | Kern et al. |
| 2006/0121811 A1 | 6/2006 | Mangold et al. |
| 2006/0137317 A1 | 6/2006 | Bryner et al. |
| 2006/0137318 A1* | 6/2006 | Lim et al. ........................ 55/528 |
| 2006/0207932 A1 | 9/2006 | Hajek et al. |
| 2006/0230731 A1 | 10/2006 | Kalayci et al. |
| 2006/0242933 A1 | 11/2006 | Webb et al. |
| 2006/0286886 A1 | 12/2006 | Komura et al. |
| 2007/0125700 A1 | 6/2007 | Ding et al. |
| 2007/0125703 A1 | 6/2007 | Chapman et al. |
| 2007/0227359 A1 | 10/2007 | Choi et al. |
| 2007/0264203 A1 | 11/2007 | Haggquist |
| 2007/0272606 A1 | 11/2007 | Freese et al. |
| 2008/0026190 A1 | 1/2008 | King et al. |
| 2008/0217241 A1 | 9/2008 | Smithies et al. |
| 2008/0272520 A1 | 11/2008 | Komura et al. |
| 2008/0307971 A1* | 12/2008 | Horie et al. .................... 55/486 |
| 2008/0314010 A1 | 12/2008 | Smithies et al. |
| 2008/0315465 A1 | 12/2008 | Smithies et al. |
| 2009/0031682 A1 | 2/2009 | Langlands et al. |
| 2009/0071111 A1 | 3/2009 | Lundgren et al. |
| 2009/0071114 A1 | 3/2009 | Smithies et al. |
| 2009/0191397 A1 | 7/2009 | Thottupurathu |
| 2009/0199715 A1 | 8/2009 | Koschak et al. |
| 2009/0266048 A1 | 10/2009 | Schwarz |
| 2010/0139224 A1* | 6/2010 | Lim et al. ........................ 55/486 |
| 2011/0016838 A1 | 1/2011 | Smithies et al. |
| 2011/0048228 A1 | 3/2011 | Handley |
| 2012/0052266 A1 | 3/2012 | Tee |

FOREIGN PATENT DOCUMENTS

| | | |
|---|---|---|
| EP | 1 614 789 A1 | 1/2006 |
| EP | 1 674 144 A1 | 6/2006 |
| EP | 1787705 | 5/2007 |
| EP | 1 878 482 B1 | 7/2011 |
| FR | 2259996 | 8/1975 |
| WO | WO 2005/034659 | 4/2005 |
| WO | WO 2007/074997 | 7/2007 |
| WO | WO2009/152439 | 12/2009 |
| WO | WO 2011/011620 | 1/2011 |

OTHER PUBLICATIONS

International Search Report and Written Opinion mailed Aug. 4, 2009.

Declaration of Thomas D. Raether dated Jan. 11, 2012.

* cited by examiner

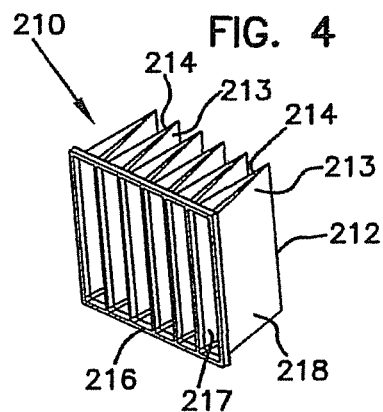
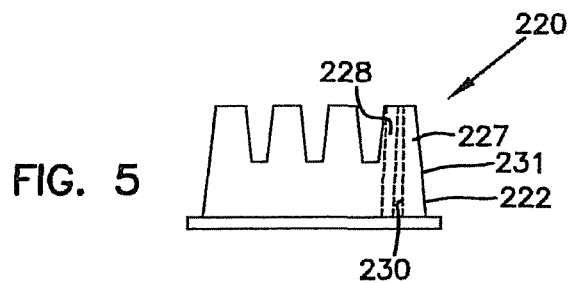
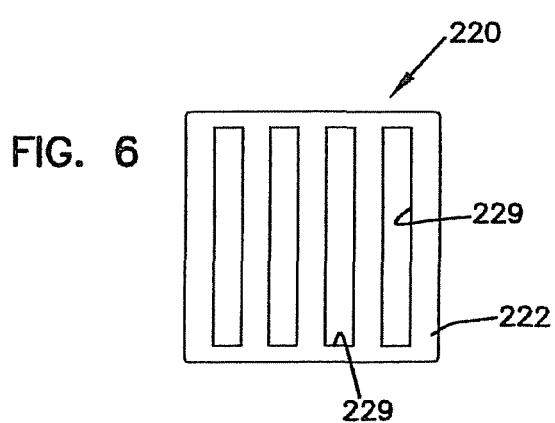
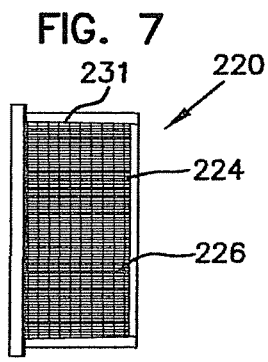

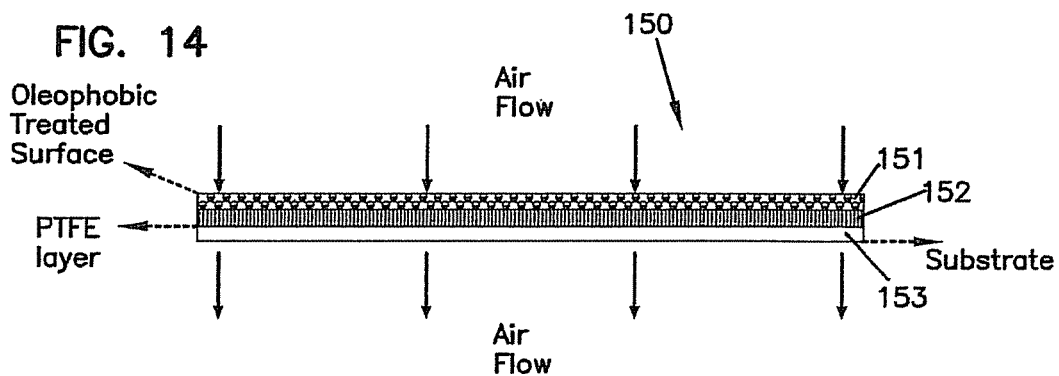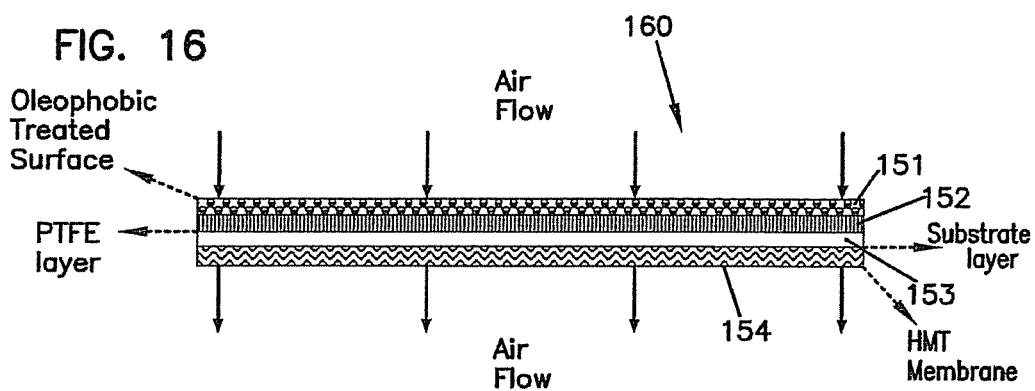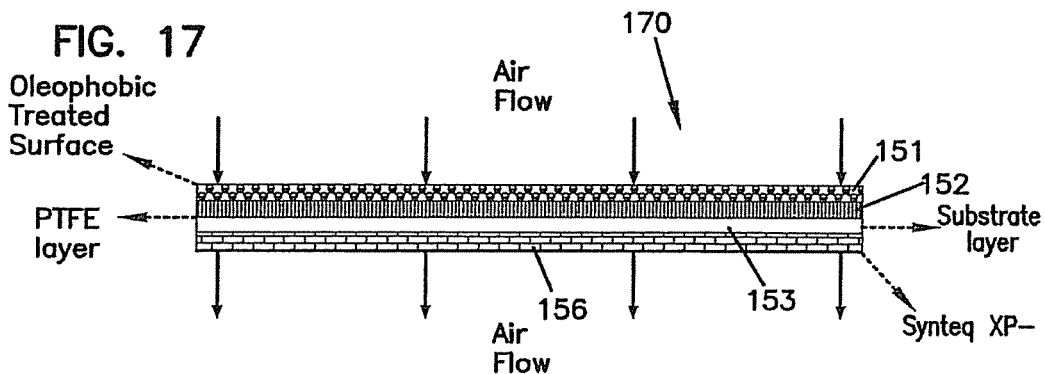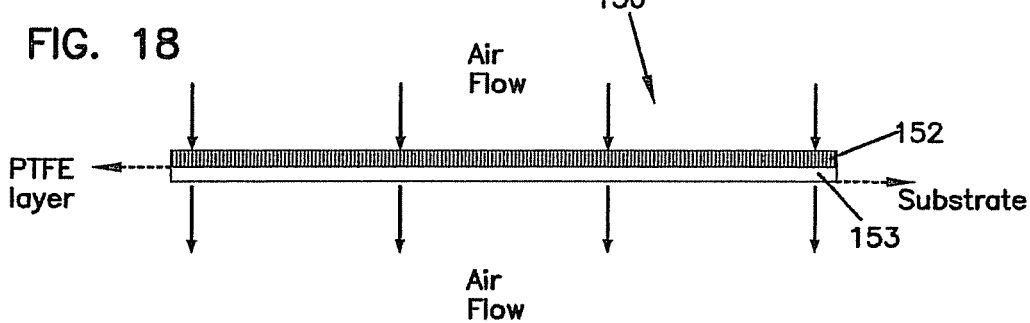

US 8,721,756 B2

FILTER CONSTRUCTION FOR USE WITH AIR IN-TAKE FOR GAS TURBINE AND METHODS

REFERENCE TO RELATED APPLICATIONS

This application is a continuation of U.S. application Ser. No. 12/482,911, filed Jun. 11, 2009, which claims priority under 35 USC 119(e) from U.S. Provisional Application 61/061,408 filed on Jun. 13, 2008, to the extent appropriate. Both of which are incorporated herein by reference in their respective entireties.

TECHNICAL FIELD

The present disclosure relates to air filter systems. In certain applications it concerns air filters for use in the air intake stream of gas turbine systems. Methods of filtering to achieve such effect are also provided.

BACKGROUND

Although the present disclosure may be applied in a variety of applications, it was developed for use with gas turbine filter systems. Gas turbine systems are useful in generating electricity. These types of systems are particularly convenient in that they can be constructed quickly; they are also desirable because they produce fewer harmful emissions than coal or oil based turbine systems. Gas turbines utilize air for combustion purposes. Due to the precision moving parts in these types of systems, the combustion air needs to be clean. To ensure clean air for combustion, air filters have been used to clean the air taken into the gas turbine system.

Filters are used to purify the air intake for gas turbines. The filter media used for the purification, over time, will load with contaminant. Filters are used until they are plugged (contaminant blocks all flow through the media) or until a predetermined restriction level is reached. Both are associated with flow and the work necessary to move the flow. Either too little fluid is allowed to flow through, or too much work is required to move the desired flow due to the higher restriction.

SUMMARY

The filter of the invention is a filter comprising a structure that can maintain a filter medium in an air stream to filter particulates to protect a gas turbine power system. The filter combines a mechanically adequate filter structure and an effective filter medium for to obtain a useful system.

BRIEF DESCRIPTION OF THE DRAWINGS

The accompanying drawings, which are incorporated in and constitute a part of this specification, illustrate several aspects of the invention and together with the description, serve to explain the principles of the invention. A brief description of the drawings is as follows:

FIG. 4 is a perspective view of another embodiment of another element with the PTFE filter medium of the invention usable in gas turbine systems, constructed in accordance with principles of this disclosure;

FIG. 5 is a top plan view of another filter element with the PTFE filter medium of the invention usable in an air intake for a gas turbine system, constructed in accordance with principles of this disclosure;

FIG. 6 is a front elevational view of the element of FIG. 5;

FIG. 7 is a right side elevational view of the filter element of FIG. 6;

FIG. 14-18 are cross section views of the media of the invention.

DETAILED DESCRIPTION

Figure 1:
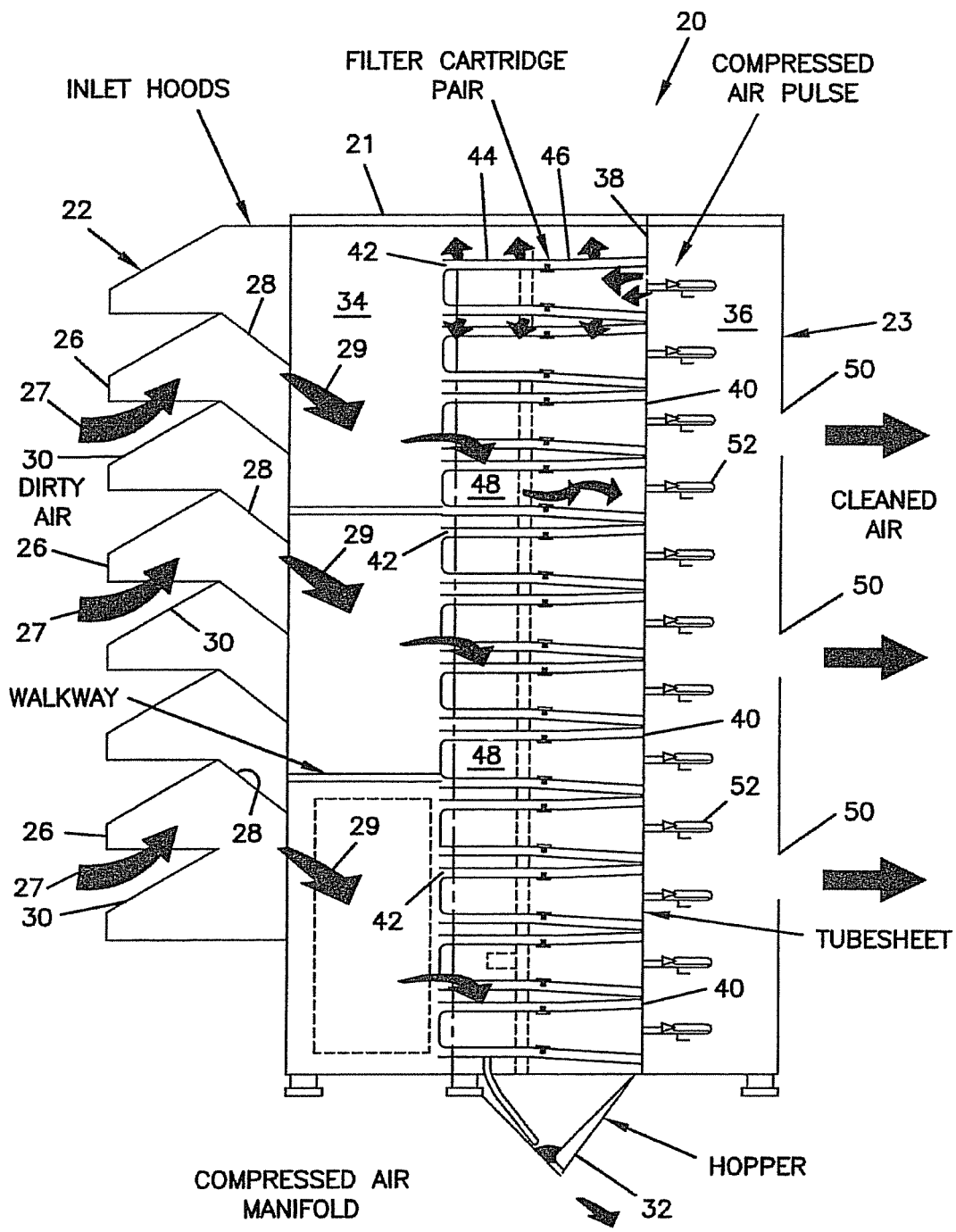
FIG. 1 is a schematic side elevational view of a first embodiment of an air intake for a gas turbine system with a plurality of filter elements, constructed in accordance with principles of this disclosure.

A durable, effective filter includes filtration media that is capable of being exposed to repeated exposures to particulate, water and other environmental conditions without degradation. A hydrophobic material that provides a barrier to particulate and liquid penetration is useful. Suitable filtration materials that can be used include expanded polytetrafluoroethylene (PTFE) membrane.

An expanded PTFE filter is used with the present invention. Expanded PTFE is made in accordance with U.S. Pat. Nos. 3,953,566, 3,962,153, 4,096,227, and 4,187,390, all are specifically incorporated by reference herein for the disclosure of the polymer and its expansion. This material is formed by heating and rapidly expanding PTFE in at least one direction. When processed in this manner, the expanded PTFE forms a microscopic structure of polymeric nodes interconnected by fibrils. Space between the nodes and fibrils are micropores that allow the passage of air and water vapor, but are too small to permit passage of liquid water or even fine water droplets. The overall structure is a barrier to particulate.

The expanded PTFE filter material for use with the present invention comprises a single layer of expanded PTFE membrane, the layer has a thickness greater than 0.1 mm or 0.1 to 1 mm thick. The final sheet ideally has the following properties. The pore size of greater than 0.1 micron to 10 micron, and a permeability range of 2 to 40 fpm.

Pore size measurements may be made by ASTM f31 6-03 using a Capillary Flow Porometer (Model CFP 1500 AEXL from Porous Materials, Inc., Ithaca, N.Y.).

The preferred expanded PTFE filter for use in the present invention provides a filtration efficiency of 60 to 99.9%, or more, at 0.3 microns. Ideally, the filter has an efficiency of 99.0 to 99.9% at 0.3 microns.

Expanded PTFE materials are produced using processes that provide an expanded layer made of nodes of interconnecting fibrils, typically considered to be related to layer formation. The preferred fluorinated thermoplastic is polytetrafluoroethylene, however, other fluorinated materials can be used such as fluorinated ethylene propylene (FEP) and other fluorinated thermoplastic materials. Such materials include copolymers of tetrafluoroethylene, polychlorotrifluoroethylene and other fluorinated materials. Other suitable membranes include membrane materials made from polypropylene and polyethylene.

The porous layer of expanded PTFE used in a fabric can be an expanded, porous PTFE layer that can satisfy the requirements of being waterproof while also being permeable to the flow of gases such as air and water vapor. Expanded porous PTFE layers are inherently hydrophobic and contain pores that resist the entry of liquid water even at substantial pressures or when rubbed or flexed, but readily allow the flow of gases. Unlike conventional PTFE layer fabric materials with sealed or closed pores that transport water through diffusion and are impermeable to bulk airflow, the permeability of the present invention is achieved by gaseous flow of air and water vapor through the layer to the clean side.

The PTFE filter material is then layered or laminated to a porous backing material, such as a porous polyester nonwoven, paper, felt, sintered polypropelene, polyethylene, polyimide, polyamide, etc. In order to increase exposed surface area, the filter material can then be folded into multiple pleats and then installed in a "rippled" or "pleated" orientation into the filtration apparatus. The pleated material can be formed into a cylinder or "tube" and then bonded together such as through the use of an adhesive (urethane, hot-melt glue, etc.), or ultrasonic welding, for example. The structure typically comprises a PTFE layer that is substantially free of any agent that fills the pores created by stretching the PTFE into a stretched porous fabric. The hydrophobic PTFE layer, having small pore sizes, can act as a barrier to particulate and aerosols, or, using its hydrophobic nature, repel liquid agents.

The filter can include an outer layer, either a woven or non-woven material that can act to protect the PTFE layer from damage, contamination or wear. Often the outer shell is combined with the PTFE layer using a variety of manufacturing techniques; however, such a combination is preferably manufactured using thermal bonding or adhesive lamination technology. Thermal bonding to the shell is the preferred method. In other multilayer constructions, the PTFE layer might be layered next to shell material, and not laminated. For example, the PTFE layer might be sewn together with the shell.

The filter can further comprise a reactive layer that includes an absorbent or adsorbent material that is active in absorbing, adsorbing and/or deactivating gaseous chemical or biological warfare agents from the ambient atmosphere as it penetrates the fabric. A variety of active chemical treatment materials and active and/or passive adsorbents or absorbents can be present in such layer.

A. System, FIG. 1

In FIG. 1, a schematic, cross-sectional, depiction of a gas turbine air intake system is depicted at 20. The system 20 includes a chamber 21 having an air inlet side 22 and an air outlet side 23. Air enters the chamber 21 through a plurality of vertically spaced inlet hoods 26 positioned along the air inlet side 22. The inlet hoods 26, although not required, function to protect internal filters of the system 20 from the effects of rain, snow and sun. Also, the inlet hoods 26 are configured such that air entering the inlet hoods 26 is first directed in an upward direction indicated by arrow 27, and then deflected by deflector plates 28 in a downward direction indicated by arrow 29. The initial upward movement of air causes some particulate material and moisture from the air stream to settle or accumulate on lower regions 30 of the inlet hoods 26. The subsequent downward movement of air forces dust within the chamber 21 downward toward a dust collection hopper 32 located at the bottom of the chamber 21. It should also be noted that air inlet side 22 may have vanes and other mechanical moisture separator inlets.

The chamber 21 of the system 20 is divided into upstream and downstream volumes 34 and 36 by a tube sheet 38 (referred to also as partition 38). The upstream volume 34 generally represents the "dirty air section" of the air cleaner system 20, while the downstream volume 36 generally represents the "clean air section" of the system 20. The tubesheet 38 defines a plurality of apertures 40 for allowing air to flow from the upstream volume 34 to the downstream volume 36. Each aperture 40 is covered by an air filter 42 or filter cartridge located in the upstream volume 34 of the chamber. The filters 42 have a filter medium comprising at least a PTFE layer as describe above or comprises a PTFE layer on a suitable support layer. The PTFE layer is on the upstream side of the medium. The filters 42 are arranged and configured such that air flowing from the upstream volume 34 to the downstream volume 36 passes through the filters 42 prior to passing through the apertures 40.

For the particular filter arrangement shown in FIG. 1, each air filter 42 includes a pair of filter elements. For example, each air filter 42 includes a cylindrical element 44 and, a somewhat truncated, conical, element 46. Each truncated, conical element 46 includes one end having a major diameter and another end having a minor diameter. The cylindrical element 44 and the truncated, conical element 46 of each filter 42 are co-axially aligned and connected end-to-end with the minor diameter end of each conical element 46 being secured to one of the cylindrical elements 44 in a sealed manner. The major diameter end of each truncated, conical element 46 is secured to the partition 38 such that an annular seal is formed around its corresponding aperture 40. Each filter 42 is generally co-axially aligned with respect to its corresponding aperture 40 and has a longitudinal axis that is generally horizontal.

Other shapes and types of filter elements can be used, as described below.

In general, during filtering, air is directed from the upstream volume 34 through the PTFE layer of the filter medium on air filters 42 into interior volumes 48 of the filters 42. After being filtered, the air flows from the interior volumes 48 through the partition 38, via apertures 40, into the downstream clean air volume 36. The clean air is then drawn out from the downstream volume 36 and into a gas turbine intake, not shown.

In this embodiment, each aperture 40 of the partition 38 includes a pulse jet air cleaner 52 mounted in the downstream volume 36. Periodically, the pulse jet air cleaner 52 is operated to direct a pulse jet of air backwardly through the associated air filter 42, i.e. from the interior volume 48 of the filter element outwardly to shake or otherwise dislodge particular material trapped in or on the PTFE layer of filter media of the air filter 42. The pulse jet air cleaners 52 can be sequentially operated from the top to the bottom of the chamber 21 to eventually direct the dust particulate material blown from the filters into the lower hopper 32, for removal. In many air pulse jet cleaning applications, a useful air pressure is generally within the range of 60 to 1500 psi. A stream of liquid, such as water, soaps, degreasers, and solvents of any kind can also dislodge particulate from the PTFE layer alone or in conjunction with the reverse air. In many liquid jet applications, a useful liquid pressure is generally within the range of 0 to 120 psi.

The properties of PTFE are such that captured particulate matter will not easily adhere to the PTFE layer in typical applications. By locating the PTFE layer on the upstream side of the filter medium, the layer is easily accessible for cleaning. As discussed previously, the cleaning of the PTFE layer can therefore be readily accomplished by various means such as air pulse cleaning or upstream washing with liquid or air. As a result, the useful service life of the filter medium can be significantly increased when the PTFE layer is located on the upstream side of the filter medium. Further, because a PTFE layer can be applied to virtually any size and style of filter medium, retrofit installations in existing systems can be readily accomplished without the need for extensive equipment modification. Thus, a gas turbine owner or operator can economically obtain a filter that has both a higher efficiency and better moisture removal characteristics than most typical filters.

B. System, FIG. 2

Figure 2:
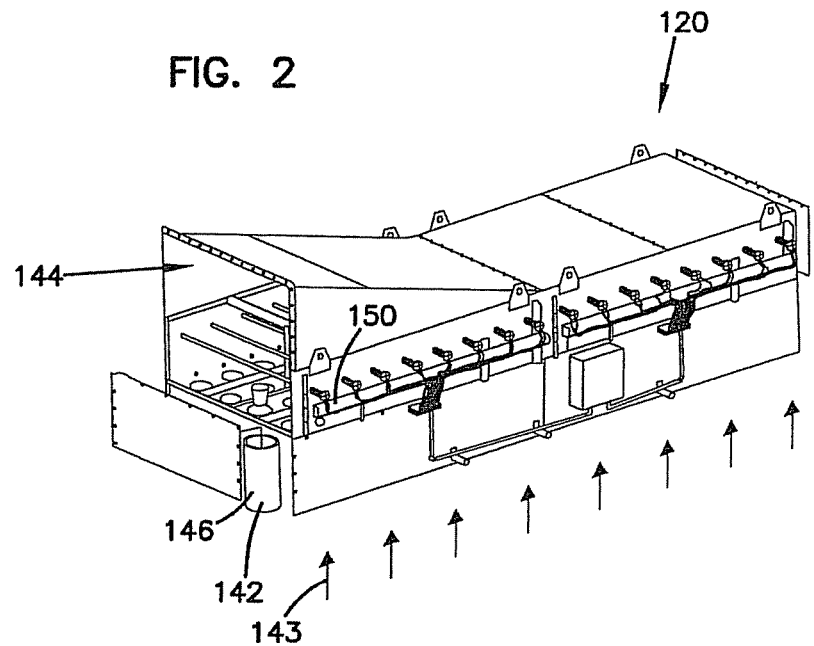
FIG. 2 is a schematic side elevational view of second embodiment of an air intake for a gas turbine system with a plurality of filter elements, constructed in accordance with principles of this disclosure.

In FIG. 2, a schematic, cross-sectional depiction of another embodiment of a gas turbine air intake system is depicted at 120. In this embodiment, there are a plurality of filter elements 142 arranged vertically such that air to be filtered flows from a direction shown by arrows 143 upwardly, through the elements 142 and then into a clean air volume 144.

In this embodiment, because of the orientation of the elements 142 and the direction of air flow, if there was any moisture, the moisture will flow by gravity downwardly along the elements 142 to a position underneath the system 120. In the embodiment shown in FIG. 2, each of the elements 142 is constructed of a cylinder of pleated media 146. The pleats in the pleated media 146 run vertically with the direction of the orientation of the elements 142. Therefore, any water or other types of moisture that contacts the media 146 will drain down along the pleats due to gravity. FIG. 2 also depicts a reverse flow pulse cleaning system 150. The reverse flow pulse cleaning system 150 emits a pulse of compressed gas periodically, such that the pulse of air will go from the downstream side through the media 146 to the upstream side. This helps to knock loose any particulate or other types of debris from the upstream side of the filter media, and periodically cleans the elements.

In other embodiments, instead of using a reverse pulse cleaning system, the elements can be cleaned from the upstream side. In such systems, the elements can be sprayed with a jet of liquid or a jet of gas. In such systems, the upstream side of the filter media is at least partially cleaned of debris and particulate matter due to the spray or jet of liquid or air washing off the upstream side of the media.

C. Example Media Constructions, FIGS. 3-13

FIGS. 3-13 depict various embodiments of filter elements using the PTFE medium that are usable in gas turbine air intake systems, such as systems 20, 120 characterized above.

Figure 3:
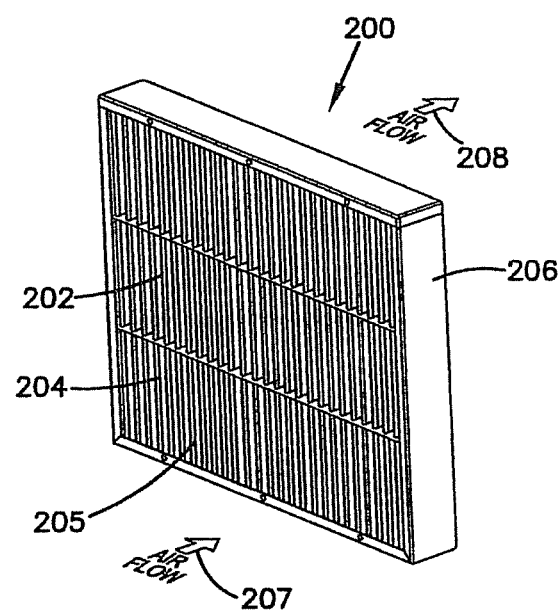
FIG. 3 is a perspective view of one embodiment of a filter element usable in the air intake systems for gas turbines, constructed in accordance with principles of this disclosure.

In FIG. 3, a pleated panel element 200 is shown in perspective view. The panel element 200 includes a media pack 202 of pleated media 204. The pleated media 204 can comprise the filter medium having a layer of a support or substrate combined with a layer of the PTFE. In the embodiment shown, the media pack 202 is held within a frame 206, with the examples shown being a rectangular frame 206. The frame 206 typically will include a gasket (not shown) for permitting the element 200 to be sealed against a tube sheet, such as tube sheet 38, in the intake system 20, 120. In FIG. 3, the upstream side of the pleated media 204 with the exterior PTFE layer is shown at 205 on the same side as the incoming air shown at arrow 207. The cleaned air is shown at arrow 208, and emerges from the media 204 from a downstream side of the media.

FIG. 4, depicts a perspective view of pocket filter element 210. The pocket element 210 includes a layer of filter media 212 that can comprise the filter medium having a layer of a support or substrate combined with a layer of the PTFE. In the embodiment shown, the pocket element 210 includes a plurality of panel pairs 213, 214, with each panel pair 213, 214 forming a V-like shape. The PTFE media 212 is secured to a frame 216. The frame 216 typically will carry a gasket for allowing the pocket element 210 to be sealed against a tube sheet, such as tube sheet 38. In such an arrangement, the media 212 has an upstream PTFE side 217, which is inside of the V's, and a downstream side 218, which is on the outside of the V's.

FIGS. 5-7 depict views of a mini-pleat or multi-V style element 220. The element 220 includes a frame 222 holding a filter media pack 224 (FIG. 7). The media pack 224 comprises a plurality of mini-pleats. The mini-pleats are arranged in a panel 226, and the element 220 includes a plurality of mini-pleated panel pairs 227, 228 (FIG. 5) of the media of the invention, each forming a V-like shape. In FIG. 5, the panel pairs 227, 228 are shown in hidden lines, since the top portion of the frame 222 obstructs the view of the panel pairs 227, 228. The frame 222 defines a plurality of dirty air inlets 229 (FIG. 6), which leads to the inside part of each V of each pleated panel pair 227, 228. Each pleated panel pair 227, 228 includes an upstream side 230, which is on the inside of the V, and a downstream side 231, which is on the outside of the V.

Figures 8, 9, 10, 11, 12:
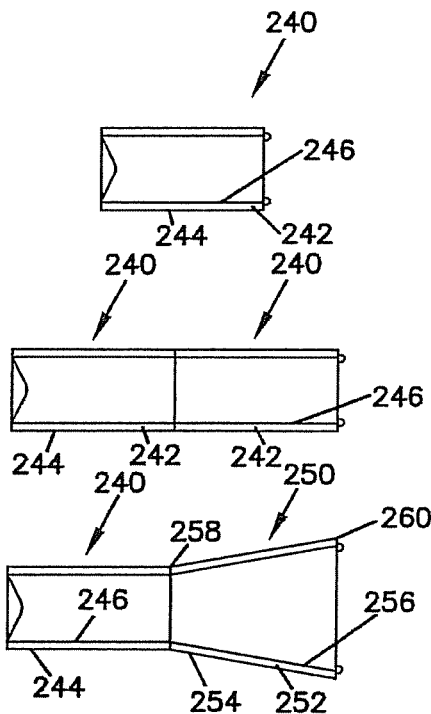
FIGS. 8-12 are schematic, cross-sectional views of further embodiments of filter elements usable in an air intake for a gas turbine system, constructed in accordance with principles of this disclosure.

FIGS. 8-13 show various embodiments of tubular, pleated filter elements. FIG. 8 shows a cylindrical pleated element 240 having a media pack 242 that can comprise the filter medium having a layer of a support or substrate combined with a layer of the PTFE with an upstream side 244 and a downstream side 246. The downstream side 246 is inside of the interior volume of the element 240.

FIG. 9 depicts two of the cylindrical elements 240 axially aligned, such that they are stacked end to end.

FIG. 10 depicts the arrangement shown in the example embodiment of FIG. 1. In FIG. 10, cylindrical element 240 is axially aligned with a partially conical element 250. The partially conical element 250 is a tubular element having a media pack 252 that can comprise the filter medium having a layer of a support or substrate combined with a layer of the PTFE. The element has an upstream side 254 and a downstream side 256. The conical element 250 has a first end 258 having a diameter that matches the diameter of the cylindrical element 240. The conical element 250 includes a second end 260 having a diameter that is larger than the diameter of the first end 258, thus forming the partial cone.

FIG. 11 depicts two partially conical elements 270, 280 arranged axially, and engaged end to end. Each of the elements 270 includes a media pack 272, 282 forming a tube that can comprise the filter medium having a layer of a support or substrate combined with a layer of the PTFE. The media packs 272, 282 each has an upstream side 274, 284 and a downstream side 276, 286.

FIG. 12 shows a single conical element 270. The element 270 can be used alone installed in the intake system for a gas turbine without being installed in element pairs, as shown in FIGS. 10 and 11.

Figure 13:
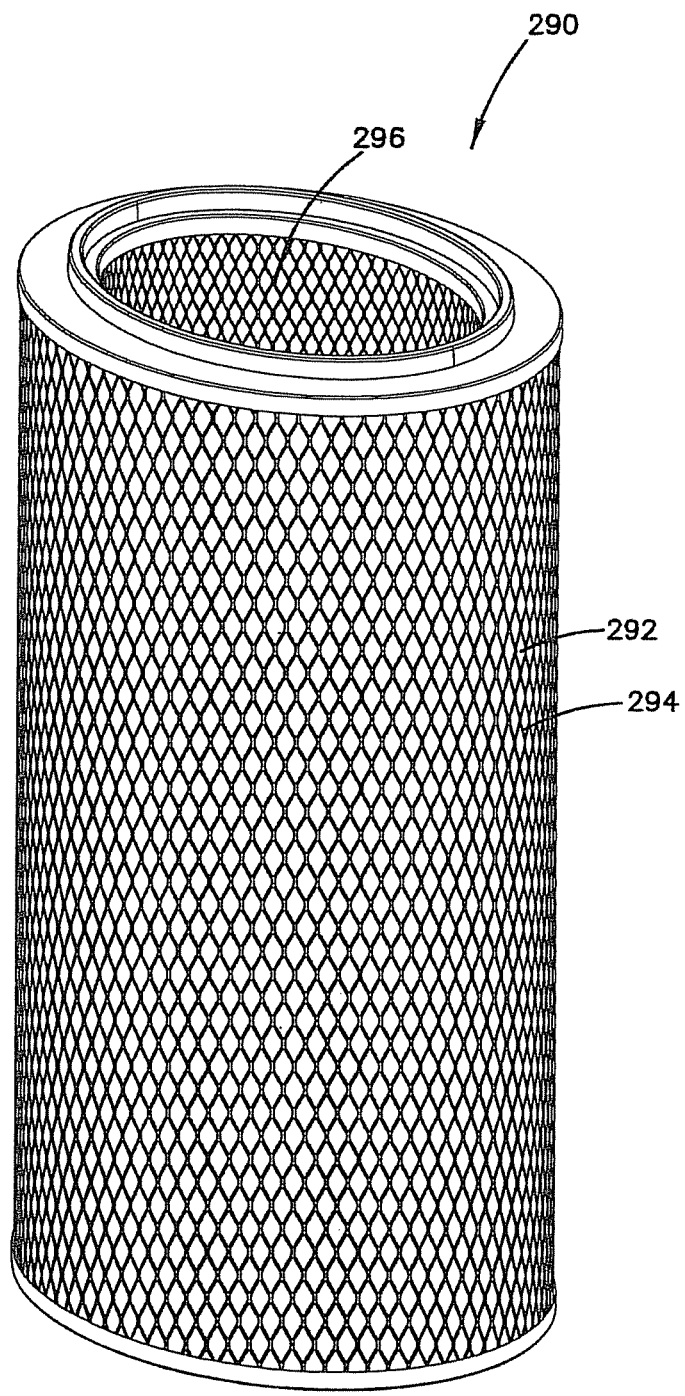
FIG. 13 is a perspective view of another embodiment of a filter element usable in an air intake for a gas turbine system, constructed in accordance with principles of this disclosure.

FIG. 13 is another embodiment of a filter element 290 having media pack 292 that can comprise the filter medium having a layer of a support or substrate combined with a layer of the PTFE. The media pack 292 is pleated and forms a tubular shape. In this embodiment, the tubular shape is an oval shape, and in one example embodiment, a ratio of the short axis compared to the long axis of the oval is about 0.7-0.9. The media 292 includes an upstream side 294 and a downstream side 296.

It should be understood that each of the filter elements characterized above and depicted in FIGS. 3-13 can be flat media and/or operably installed in an intake or ventilation system for a gas turbine, such as system 20 or system 120 of FIGS. 1 and 2.

In operation, air to be filtered will be directed through the upstream side, typically the PTFE layer and then through the downstream side of filter media in the respective filter element typically installed in a tube sheet. The filter media will remove at least some of the particulate from the air stream. After passing through the downstream side of the media, the filtered air is then directed to the gas turbine.

The filter elements can be cleaned. In operation, a method of cleaning a filter element for a gas turbine air intake system includes removing at least some particulate material from the upstream side of the media pack of the filter element operably installed in the tube sheet of the gas turbine air intake system. The step of removing can include pulsing a jet of compressed gas from the downstream side to the upstream side. Alternatively, the step of removing can include spraying the upstream side with a jet of air or liquid. Alternatively, the cleaning step can use a reverse air step and a liquid stream, serially or in combination.

D. Example Media Formulations

This invention provides improved PTFE filtration media and pulse cleanable filter elements thereof, to protect gas turbine systems from the deleterious effects of salt, moisture and hydrocarbons at the intake air of gas turbine systems. Furthermore, other outdoor filtration applications include the protection of electronic enclosures at cell base towers can benefits from the improved media technology. PTFE filtration layer is provided on a substrate. The substrate can be of any kind that can be laminated or otherwise combined with the PTFE layer. The substrate can have properties beyond its service as a surface for the PTFE. These properties can include coalescing, depth loading etc. It is also important to recognize that the substrate layer provides the necessary anchoring surface for not only the PTFE layer but also for any additional nanofiber media layer such as "electroblown" nanofiber layer/hybrid membrane (example DuPont HMT). The surface of such PTFE laminate media may be treated with oleophobic treatment to repel hydrocarbons in the air.

EXAMPLE 1

FIGS. 14 and 18 show a cross section of one embodiment of the media of the invention. In FIGS. 14 and 18, the media 150 includes a membrane layer, referred to as PTFE layer 152. Media 150 also includes a substrate layer 153 for supporting PTFE layer 152, and optionally for further filtering the air stream. Substrate layer 153 may be wet laid or air laid and may be comprised of spunbond media. On FIG. 14 specifically, media 150 also includes first oleophobic coating 151 on the membrane layer 152. Such oleophobic coatings can comprise any coating material that has substantial hydrophobicity. Such materials are often non-hydrophilic but repel oil and other organic substances. Such coatings are common and are well known to one of ordinary skill in the art. The oleophobic coating 151 covers the PTFE layer 152.

Figure 15:
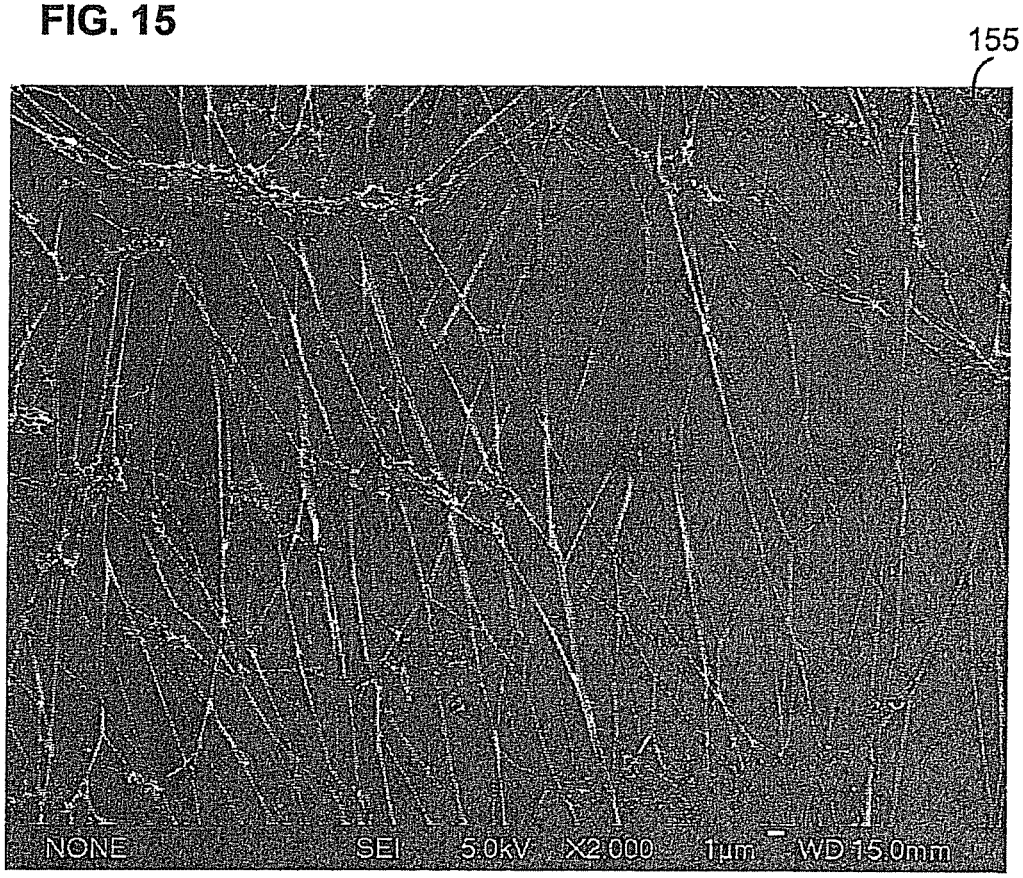

FIG. 15 shows a electron photomicrograph of the expanded PTFE layer of the invention. In the figure are fibers 155.

The final laminate will provide resistance to salt, water and hydrocarbons in the air. The minimum efficiency of the media will be Merv 14 or F9 (EN1822 standard). Also, the finished cartridge element using this type of media will have similar initial restrictions at same air flow as current media being used on existing system. This media further can be designed to have efficiency higher than HEPA and H12-H-13 (EN1822, MPP efficiency 99.95% @ 0.08 micron).

EXAMPLE 2

The media construction in FIG. 16 is similar to Example #1, except that it will have another media downstream of the PTFE filtration layer. Similarly, FIG. 16 shows a preferred media embodiment of the invention. Similarly, media layer 160 is a multilayer structure. The media comprises an oleophobic layer 151, a PTFE layer 152, a conventional melt blown substrate 153 and a hybrid membrane layer 154. The downstream layer 154 can be another layer of membrane, more specifically but not limited to electroblown nanofiber membrane. A hybrid membrane layer is made by using a spinning process to create a membrane-like nonwoven sheet structure of continuous sub-micron polymeric filaments between 200-600 nanometers. Hybrid membranes are referred to as a nanofiber because the filtration industry, our predominant end use market, broadly uses the term "nanofiber" to describe any fiber between the size of 100 nm to about 800 nm. This is important because especially in environments with high humidity and abundance of salt particles, i.e. marine environments such as off shore or seaside environments, it is necessary to protect the critical equipment downstream of the filtration arrangement from the deleterious impact of nano-sized airborne salt that can be generated by wave breaking and is carried by the wind, which can in turn deliquesce or change physical state with varying humidity conditions and penetrate through the filtration arrangement and foul the equipment downstream. It is worth noting here that the particulates that can change physical state may not be limited to salt. It can include other forms of particulate matter. Also, it is important to recognize that conditions suitable for the particulate to change physical state can be realized in environments beyond marine environments described above. Certain localities or industrial processes can result in the right environmental conditions for the salt or other particulate types to deliquesce and penetration through the filter arrangement.

The salt particles and other fine particles escaping through PTFE layer will have added protection to be captured in downstream media there by assuring 100% capture of such particles to prevent any blade erosion.

EXAMPLE 3

In this example, a wet laid media (See FIG. 17) is used on the down stream side of the composite. FIG. 17 shows a version of the media of the invention using a wet layer substrate material. In FIG. 17 a media 170 is shown. The media comprises a wet laid substrate 156, a conventional cellulosic or air layer substrate 153, the PTFE layer 152 and an external upstream oleophobic layer 151. The wet laid media can have a gradient density if needed but it is essentially intended to provide a depth loading structure and is used to increase the efficiency of the media by capturing any particles escaping through upstream filtration media. A suitable wet laid media that can be used in this application is Donaldson's Synteq XP technology. Donaldson's U.S. Pat. No. 7,314,497 which is incorporated, especially herein for its disclosure of a media layer that can be made by combining bicomponent fiber with other fiber sources including other filtration fibers, binder fibers, reinforcing fibers, reactive fibers and other components.

The use of the bicomponent fiber enables the formation of a media layer or filter element that can be formed with no separate resin binder or with minimal amounts of a resin binder that substantially reduces or prevents film formation from the binder resin and also prevents lack of uniformity in the media or element due to migration of the resin to a particular location of the media layer. The use of the bicomponent fiber permits reduced compression, improves solidity, increases tensile strength and improves utilization of media fiber such as glass fiber and other tine fiber materials added to the media layer or filter element. Media fiber is that fiber that provides filtration properties to the media such as controllable pore size, permeability and efficiency. Further, the bicomponent fiber obtains improved processability during furnish formulation, sheet or layer formation and downstream processing including thickness adjustment, drying, cutting and fitter element formation. These components combine in various proportions to form a high strength material having substantial filtration capacity, permeability and filtration lifetime. The media of the invention can maintain, intact, filtration capacity for substantial periods of time at substantial flow rates and substantial efficiency.

"Bicomponent fiber" means a thermoplastic material having at least one fiber portion with a melting point and a second thermoplastic portion with a lower melting point. The physical configuration of these fibers is typically in a "side-by-side" or "sheath-core" structure. in side-by-side structure, the two resins are typically extruded in a connected form in a side-by-side structure. One could also use lobed fibers where the tips have lower melting point polymer.

Various combinations of polymers for the bicomponent fiber may be useful in the present invention, but it is important that the first polymer component melt at a temperature tower than the melting temperature of the second polymer component and typically below 205° C. Further, the bicomponent fibers are integrally mixed and evenly dispersed with the pulp fibers. Melting of the first polymer component of the bicomponent fiber is necessary to allow the bicomponent fibers to form a tacky skeletal structure, which upon cooling, captures and binds many of the secondary fibers, as well as binds to other bicomponent fibers.

In the sheath-core structure, the low melting point (e.g., about 80 to 205° C.) thermoplastic is typically extruded around a fiber of the higher melting (e.g., about 120 to 260° C.) point material. In use, the bicomponent fibers typically have a fiber diameter of about 5 to 50 micrometers often about 10 to 20 micrometers and typically in a fiber form generally have a length of 0.1 to 20 millimeters or often have a length of about 0.2 to about 15 millimeters. Such fibers can be made from a variety of thermoplastic materials including polyolefins (such as polyethylenes, polypropylenes), polyesters (such as polyethylene terephthalate, polybutylene terephthalate, PCT), nylons including nylon 6, nylon 6,6, nylon 6,12, etc. Any thermoplastic that can have an appropriate melting point can be used in the low melting component of the bicomponent fiber while higher melting polymers can be used in the higher melting "core" portion of the fiber. The cross-sectional structure of such fibers can be, as discussed above, the "side-by-side" or "sheath-core" structure or other structures that provide the same thermal bonding function. One could also use lobed fibers where the tips have lower melting point polymer. The value of the bicomponent fiber is that the relatively low molecular weight resin can melt under sheet, media, or filter forming conditions to act to bind the bicomponent fiber, and other fibers present in the sheet, media, or filter making material into a mechanically stable sheet, media, or filter.

Typically, the polymers of the bicomponent (core/shell or sheath and side-by-side) fibers are made up of different thermoplastic materials, such as for example, polyolefin/polyester (sheath/core) bicomponent fibers whereby the polyolefin, e.g. polyethylene sheath, melts at a temperature lower than the core, e.g. polyester. Typical thermoplastic polymers include polyolefins, e.g. polyethylene, polypropylene, polybutylene, and copolymers thereof, polytetrafluoroethylene, polyesters, e.g. polyethylene terephthalate, polyvinyl acetate, polyvinyl chloride acetate, polyvinyl butyral, acrylic resins, e.g. polyacrylate, and polymethylacrylate, polymethylmethacrylate, polyamides, namely nylon, polyvinyl chloride, polyvinylidene chloride, polystyrene, polyvinyl alcohol, polyurethanes, cellulosic resins, namely cellulosic nitrate, cellulosic acetate, cellulosic acetate butyrate, ethyl cellulose, etc., copolymers of any of the above materials, e.g. ethylene-vinyl acetate copolymers, ethylene-acrylic acid copolymers, styrene-butadiene block copolymers, Kraton rubbers and the like. Particularly preferred in the present invention is a bicomponent fiber known as 271P available from DuPont. Others fibers include FIT 201, Kuraray N720 and the Nichimen 4080 and similar materials. All of these demonstrate the characteristics of cross-linking the sheath poly upon completion of first melt. This is important for liquid applications where the application temperature is typically above the sheath melt temperature. If the sheath does not fully crystallize then the sheath polymer will remelt in application and coat or damage downstream equipment and components.

The media of the invention can be made from a media fiber. Media fibers include a broad variety of fibers having the correct diameter, length and aspect ratio for use in filtration can be used in the manufacture of the media of the invention. The glass fiber provides pore size control and cooperates with the other fibers in the media to obtain a media of substantial flow rate, high capacity, substantial efficiency and high wet strength. The term glass fiber "source" means a glass fiber composition characterized by an average diameter and aspect ratio that is made available as a distinct raw material. Blends of one or more of such sources do not read on single sources.

We have found that by blending various proportions of bicomponent and media fiber that substantially improved strength and filtration can be obtained. Further, blending various fiber diameters can result in enhanced properties. Wet laid or dry laid processes can be used, In making the media of the invention, a fiber mat is formed using either wet or dry processing. The mat is heated to melt thermoplastic materials to form the media by internally adhering the fibers, The bicomponent fiber used in the media of the invention permits the fiber to fuse into a mechanically stable sheet, media, or filter, The bicomponent fiber having a thermally bonding exterior sheath causes the bicomponent fiber to bind with other fibers in the media layer. The bicomponent fiber can be used with an aqueous or solvent based resin and other fibers to form the medium.

In the preferred wet laid processing, the medium is made from an aqueous furnish comprising a dispersion of fibrous material in an aqueous medium. The aqueous liquid of the dispersion is generally water, but may include various other materials such as pH adjusting materials, surfactants, defoamers, flame retardants, viscosity modifiers, media treatments, colorants and the like. The aqueous liquid is usually drained from the dispersion by conducting the dispersion onto a screen or other perforated support retaining the dispersed solids and passing the liquid to yield a wet paper composition. The wet composition, once formed on the support, is usually further dewatered by vacuum or other pressure forces and further dried by evaporating the remaining liquid. After liquid is removed, thermal bonding takes place typically by melting some portion of the thermoplastic fiber, resin or other portion of the formed material. The melt material binds the component into a layer.

The preferred media fiber comprises a glass fiber used in media of the present include glass types known by the designations: A, C, D, E, Zero Boron E, ECR,AR, R, S, S-2, N, and the like, and generally, any glass that can be made into fibers either by drawing processes used for making reinforcement fibers or spinning processes used for making thermal insulation fibers. Such fiber is typically used as a diameter about 0.1 to 10 micrometers and an aspect ratio (length divided by diameter) of about 10 to 10000. These commercially available fibers are characteristically sized with a sizing coating. Such coatings cause the otherwise ionically neutral glass fibers to form and remain in bundles. Glass fiber in diameter less than about 1 micron is not sized. Large diameter chopped glass is sized.

Manufacturers of glass fibers commonly employ sizes such as this. The sizing composition and cationic antistatic agent eliminates fiber agglomeration and permits a uniform dispersion of the glass fibers upon agitation of the dispersion in the tank. The typical amount of glass fibers for effective dispersion in the glass slurry is within the range of 50% to about 90%, and most preferably about 50-80%, by weight of the solids in the dispersion. Blends of glass fibers can substantially aid in improving permeability of the materials. We have found that combining a glass fiber having an average fiber diameter of about 0.3 to 0.5 micrometer, a glass fiber having an average fiber diameter of about 1 to 2 micrometers, a glass fiber having an average fiber diameter of about 3 to 6 micrometers, a glass fiber with a fiber diameter of about 6 to 10 micrometers, and a glass fiber with a fiber diameter of about 10 to 100 micrometers in varying proportions can substantially improve permeability. We believe the glass fiber blends obtain a controlled pore size resulting in a defined permeability in the media layer.

Non-woven media of the invention can contain secondary fibers made from a number of both hydrophilic, hydrophobic, oleophilic, and oleophobic fibers. These fibers cooperate with the glass fiber and the bicomponent fiber to form a mechanically stable, but strong, permeable filtration media that can withstand the mechanical stress of the passage of fluid materials and can maintain the loading of particulate during use. Secondary fibers are typically monocomponent fibers with a diameter that can range from about 0.1 to about 50 micrometers and can be made from a variety of materials including naturally occurring cotton, linen, wool, various cellulosic and proteinaceous natural fibers, synthetic fibers including rayon, acrylic, aramide, nylon, polyolefin, polyester fibers, One type of secondary fiber is a binder fiber that cooperates with other components to bind the materials into a sheet. Another type of secondary fiber is a structural fiber that cooperates with other components to increase the tensile and burst strength the materials in dry and wet conditions. Additionally, the binder fiber can include fibers made from such polymers as polyvinyl chloride, polyvinyl alcohol. Secondary fibers can also include inorganic fibers such as carbohlgraphite fiber, metal fiber, ceramic fiber and combinations thereof.

The secondary thermoplastic fibers include, but are not limited to, polyester fibers, polyamide fibers, polypropylene fibers, copolyetherester fibers, polyethylene terephthalate fibers, polybutylene terephthalate fibers, polyetherketoneketone (PEKK) fibers, polyetheretherketone (PEEK) fibers, liquid crystalline polymer (LCP) fibers, and mixtures thereof. Polyamide fibers include, but are not limited to, nylon 6, 66, 11, 12, 612, and high temperature "nylons" (such as nylon 46) including cellulosic fibers, polyvinyl acetate, polyvinyl alcohol fibers (including various hydrolysis of polyvinyl alcohol such as 88% hydrolyzed, 95% hydrolyzed, 98% hydrolyzed and 99.5% hydrolyzed polymers), cotton, viscose rayon, thermoplastic such as polyester, polypropylene, polyethylene, etc., polyvinyl acetate, polylactic acid, and other common fiber types. The thermoplastic fibers are generally fine (about 0.5-20 denier diameter), short (about 0.1-5 cm long), staple fibers, possibly containing precompounded conventional additives, such as antioxidant, stabilizers, lubricants, tougheners, etc, .In addition, the thermoplastic fibers may be surface treated with a dispersing aid. The preferred thermoplastic fibers are polyamide and polyethylene terephthalate fibers, with the most preferred being polyethylene terephthalate fibers.

We claim:

1. A filter medium comprising:
a depth loading structure comprising a porous wet laid substrate having anchoring surfaces, wherein the wet laid substrate comprises bicomponent fibers and at least one other type of fiber selected from filtration fibers, binder fibers, reinforcing fibers, and reactive fibers;
a PTFE membrane disposed on an anchoring surface of the porous wet laid substrate; and
a nanofiber media layer disposed on an anchoring surface of the porous wet laid substrate.

2. The filter medium of claim 1 wherein the filter medium further comprises an oleophobic coating.

3. The filter medium of claim 1 wherein the nanofiber is electroblown.

4. The filter medium of claim 1 designed to filter particulates from an air stream.

5. Air filtration medium comprising:
a depth loading structure comprising a porous wet laid substrate having anchoring surfaces, wherein the porous wet laid substrate comprises bicomponent fibers and glass fibers;
a PTFE membrane disposed on an anchoring surface of the porous wet laid substrate; and
a nanofiber media layer disposed on an anchoring surface of the porous wet laid substrate.

6. The air filtration medium of claim 5 wherein the nanofiber is electroblown.

7. The air filtration medium of claim 5 wherein the filter medium further comprises an oleophobic coating.

8. The air filtration medium of claim 1 wherein the nanofiber has a fiber size of 100 nm to 800 nm.

9. The air filtration medium of claim 8 wherein the nanofiber has a fiber size of 200 nm to 600 nm.

10. The air filtration medium of claim 5 wherein the nanofiber has a fiber size of 100 nm to 800 nm.

11. The air filtration medium of claim 10 wherein the nanofiber has a fiber size of 200 nm to 600 nm.

12. Air filtration medium comprising:
a depth loading structure comprising a porous wet laid substrate having anchoring surfaces, wherein the porous wet laid substrate comprises bicomponent fibers, glass fibers, and one or more types of secondary fibers;
a PTFE membrane disposed on an anchoring surface of the porous wet laid substrate; and
a nanofiber media layer disposed on an anchoring surface of the porous wet laid substrate, wherein the nanofiber is electroblown and has a fiber size of 200 nm to 600 nm.

13. The filter medium of claim 12 wherein the filter medium further comprises an oleophobic coating.

* * * * *